J. H. Harris,
Trace Carrier.
No. 88,038. Patented Mar. 23, 1869.
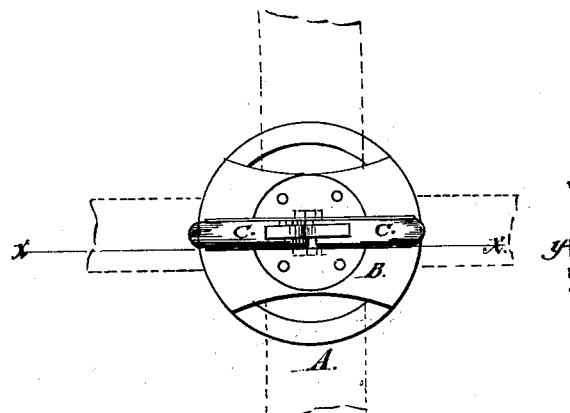
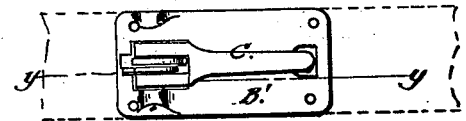
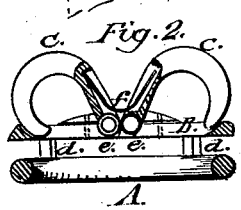
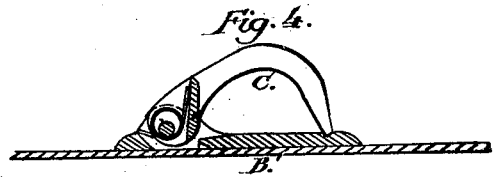
Witnesses:
Chas. Nida
Wm. A. Morgan
Inventor:
James H. Harris
by Munn & Co.
Attorney.

JAMES H. HARRIS, OF VERMONT, ILLINOIS.

Letters Patent No. 88,038, dated March 23, 1869.

IMPROVED TRACE-CARRIER.

The Schedule referred to in these Letters Patent and making part of the same.

*To all whom it may concern:*

Be it known that I, JAMES H. HARRIS, of Vermont, in the county of Fulton, and State of Illinois, have invented a new and useful Improvement in Trace-Carriers; and I do hereby declare that the following is a full, clear, and exact description thereof, which will enable others skilled in the art to make and use the same, reference being had to the accompanying drawings, forming part of this specification.

This invention relates to an attachment to harnesses for holding and carrying the traces, or tugs, when the team is detached from the wagon or carriage, and consists in a ring, in connection with a plate, and hooks, which ring forms a portion of the harness-fastening, or to which the back-strap, crupper, and hip-straps are attached to the ring, and the parts connected therewith being placed on the rump of the horse, the hooks being for holding the traces, as hereinafter described.

Figure 1 is a top view.

Figure 2 is a vertical section of fig. 1, through the line $x\ x$.

Figure 3 represents a single holder on a plate, without the ring.

Figure 4 is a section of the same, through the line $y\ y$.

Similar letters of reference indicate corresponding parts.

A is the ring.

B is a slotted plate.

C represents the holding-plate.

The ring A serves to hold the parts of the harness called the back-strap, the crupper, and the hip-straps together, they all being attached to it, as seen in fig. 1, over the rump of the horse.

The slotted plate B is raised from the ring by studs $d$, as seen in fig. 2, so that the hip-straps may be connected under it.

The hooks, $c\ c$, are attached at or near the centre, and hang on pivots within the slot in the plate B, as seen in fig. 2, at $e$.

$f$ is a spring between the hooks, which serves to press the springs apart, and throw their outer ends down into the ends of the slot, as seen in the drawing.

I propose to use the hook on a simple plate, attached to the hip-straps, or to any other convenient part of the harness.

B' represents such a plate, with the hook turning on a pin, supported on ears, or projections on the plate.

The object of the holder, or carrier is the same in both cases, that is, to support and carry the traces of a harness, when the horse or horses are removed from the carriage, and the harness left on.

The hook on plate B' is kept in place by a spring.

Having thus described my invention,

What I claim as new, and desire to secure by Letters Patent, is—

1. In combination with a wagon or carriage-harness, the ring A, plate B, and hooks $c$, arranged and operating substantially as and for the purposes described.

2. The plate B' and hook $c$, in combination with a harness, substantially as and for the purposes described.

The above specification of my invention signed by me, this 14th day of January, 1869.

JAMES H. HARRIS.

Witnesses:
 H. S. THOMAS,
 JAMES A. RUSSELL.